US006440491B1

(12) United States Patent
Varaprasad et al.

(10) Patent No.: US 6,440,491 B1
(45) Date of Patent: Aug. 27, 2002

(54) PROCESSES FOR FORMING TRANSPARENT SUBSTRATE WITH DIFFUSER SURFACE

(75) Inventors: Desaraju V. Varaprasad, Holland; Craig A. Dornan, Grand Haven; Catherine A. Getz, Holland, all of MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/607,216

(22) Filed: Jun. 30, 2000

Related U.S. Application Data

(62) Division of application No. 09/348,086, filed on Jul. 6, 1999, now Pat. No. 6,087,012, which is a continuation of application No. 09/014,818, filed on Jan. 28, 1998, now Pat. No. 6,001,486, which is a continuation of application No. 08/708,803, filed on Sep. 9, 1996, now Pat. No. 5,725,957, which is a division of application No. 08/282,307, filed on Jul. 29, 1994, now abandoned.

(51) Int. Cl.[7] .................................................. B05D 5/06
(52) U.S. Cl. ........................ 427/168; 427/169; 427/387; 427/407.2
(58) Field of Search ................................ 427/387, 164, 427/165, 168, 169, 407.2

(56) References Cited

U.S. PATENT DOCUMENTS

| | | | |
|---|---|---|---|
| 2,474,061 A | 6/1949 | Moulton ............................. 88/1 |
| 2,584,905 A | 2/1952 | Moulton et al. .............. 105/287 |
| 2,655,452 A | 10/1953 | Barnes et al. ................... 106/52 |
| 2,680,205 A | 6/1954 | Burton .......................... 313/92 |
| 2,782,676 A | 2/1957 | Osterberg .......................... 88/1 |
| 3,094,436 A | 6/1963 | Schroder ..................... 117/215 |
| 3,356,522 A | 12/1967 | Libbert ....................... 117/33.5 |
| 3,635,751 A | 1/1972 | Long, III et al. |
| 3,679,451 A * | 7/1972 | Marks et al. |
| 3,811,918 A | 5/1974 | Levene ......................... 428/213 |
| 4,161,547 A | 7/1979 | Kienel ......................... 350/164 |
| 4,260,222 A | 4/1981 | Kozawa ....................... 428/472 |
| 4,282,290 A | 8/1981 | Pellicori et al. |
| 4,289,822 A | 9/1981 | Shimada et al. |
| 4,346,131 A | 8/1982 | Yoldas ......................... 428/35 |
| 4,361,598 A | 11/1982 | Yoldas ......................... 427/74 |
| 4,446,171 A | 5/1984 | Thomas ....................... 427/160 |
| 4,535,026 A | 8/1985 | Yoldas et al. ............. 428/310.5 |
| 4,596,745 A | 6/1986 | Chao ........................... 428/428 |
| 4,652,467 A | 3/1987 | Brinker et al. .............. 427/246 |
| 4,671,990 A | 6/1987 | Jada et al. ................... 428/266 |
| 4,694,218 A | 9/1987 | Chao ........................... 313/478 |
| 4,824,712 A | 4/1989 | Falleroni et al. ............. 428/137 |

(List continued on next page.)

FOREIGN PATENT DOCUMENTS

| | | | |
|---|---|---|---|
| EP | 574112 A1 | * | 12/1993 |
| JP | 03-259989 | * | 11/1991 |
| JP | 06-052796 | * | 2/1994 |

*Primary Examiner*—Erma Cameron
(74) *Attorney, Agent, or Firm*—Van Dyke, Gardner, Linn & Burkhart, LLP

(57) ABSTRACT

Processes for making a transparent substrate having a glare reducing diffuser surface coating on its outer surface are disclosed to provide a faceplate such as for attachment to a screen for a cathode ray tube or other display device. Preferably, the coating has a thickness of less than about 3 microns and/or a gloss less than about 80 gloss units. The method includes spraying a precursor solution onto the substrate to form a preliminary coating, at least partially densifying that preliminary coating, spraying another coating of precursor solution onto the preliminary coating, and firing the coating to form a diffuser surface coating. Alternately, a precursor solution of an inorganic metal oxide dissolved in an organic solvent is sprayed on the substrate and fired at a temperature within the range of from about 250° C. to about 600° C. to form the diffuser surface coating.

26 Claims, 2 Drawing Sheets

U.S. PATENT DOCUMENTS

| | | |
|---|---|---|
| 4,830,879 A | 5/1989 | Debsikdar .................... 427/162 |
| 4,945,282 A | 7/1990 | Kawamura et al. ......... 313/479 |
| 4,960,618 A | 10/1990 | Tanitsu et al. .............. 427/226 |
| 4,965,096 A | 10/1990 | Deal et al. ................... 427/165 |
| 4,996,083 A | 2/1991 | Moser et al. ................ 427/108 |
| 5,011,732 A | 4/1991 | Takeuchi et al. ............ 428/209 |
| 5,013,607 A | 5/1991 | Sato et al. ................... 428/426 |
| 5,108,479 A | 4/1992 | Hirano ....................... 65/60.52 |
| 5,123,940 A | 6/1992 | Digiovanni et al. .......... 65/312 |
| 5,137,560 A | 8/1992 | Ohmura et al. ............ 65/60.52 |
| 5,137,749 A | 8/1992 | Yamazaki et al. .......... 427/108 |
| 5,153,027 A | 10/1992 | Spagnoli ..................... 427/163 |
| 5,291,097 A | 3/1994 | Kawamura et al. ......... 313/478 |
| 5,519,282 A | 5/1996 | Takizawa et al. ........... 313/478 |
| 5,599,579 A | 2/1997 | Iwasaki ....................... 427/64 |
| 5,725,957 A | 3/1998 | Varaprasad et al. |
| 5,742,118 A | 4/1998 | Endo et al. |
| 5,770,258 A | 6/1998 | Takizawa et al. .............. 427/64 |
| 5,789,854 A | 8/1998 | Takizawa et al. ........... 313/478 |
| 5,880,557 A | 3/1999 | Endo et al. ................. 313/461 |
| 6,001,486 A | 12/1999 | Varaprasad et al. ......... 428/428 |

\* cited by examiner

PROCESSES FOR FORMING TRANSPARENT SUBSTRATE WITH DIFFUSER SURFACE

CROSS REFERENCE TO RELATED APPLICATIONS

This application is a division of prior pending application Ser. No. 09/348,086, filed Jul. 6, 1999, now U.S. Pat. No. 6,087,012 which is a continuation of Ser. No. 09/014,818, filed Jan. 28, 1998, now U.S. Pat. No. 6,001,486, which is a continuation of Ser. No. 08/708,803, filed Sep. 9, 1996, now U.S. Pat. No. 5,725,957, which is a division of Ser. No. 08/282,307, filed Jul. 29, 1994, now abandoned, the disclosures of which are hereby incorporated by reference herein.

BACKGROUND OF THE INVENTION

The present invention relates to glare reduction in transparent substrates, particularly glass. Low gloss, glare reducing glass is utilized in a wide array of applications such as cathode ray tube screens or other display devices (monitors, televisions, liquid crystal displays, etc.); input or selection devices such as touch screens or input panels; glass enclosed displays (museums or other public displays); optical filters; picture frames; windows for architectural applications; glass components employed in mirrors; solar collector cover plates; optical lenses utilized in eyewear and viewing devices; and windshields for vehicles.

There are primarily two methods of reducing glare associated with surfaces of glass substrates. The first method involves depositing an "interference" coating stack on the glass substrate that controls glare by taking advantage of the optical interference within thin films. Such films usually have a thickness of about one-quarter or one-half the nominal wavelength of visible light, depending on the relative indexes of refraction of the coating and glass. The second method involves forming a light scattering, i.e. diffusing, means at the surface of the glass, usually by altering the characteristics of the outermost surface of either the glass substrate or via a diffuser coating on the glass substrate.

Interference coatings reduce glare without reducing resolution. However, they are relatively expensive to deposit, requiring the use of relatively high cost vacuum deposition techniques such as sputtering and precise manufacturing conditions, or very precise alkoxide solution dip coating techniques, with subsequent drying and firing. Strict thickness control and uniformity are required.

In attempting to reduce glare by diffusion of light (the second method noted above), prior artisans have etched the outer surface of the glass substrate, or etched or otherwise modified the outer surface of a coating deposited on the glass substrate. There are numerous drawbacks in etching or otherwise modifying the surface characteristics of a substrate or coated substrate. Etching by chemical means involves handling and storage of generally highly corrosive compounds (e.g. hydrofluoric acid). Such compounds create processing and disposal problems in view of increasingly stringent environmental laws. Etching by non-chemical means, such as by sandblasting, necessitates additional and costly processing operations.

As an alternative to etching or altering the surface characteristics of a substrate or coated substrate, prior artisans formed relatively thick coatings, e.g. 10–20 microns, with particular surface characteristics on the substrates in order to reduce glare, and avoid the necessity of etching. This has been done, for example, by incorporating diverse materials into the coating solution which will yield coatings of mixed oxides. Other prior artisans have dispersed fine microparticles such as silica, in a suspension, typically aqueous, and applied the resulting dispersion to a glass surface. When the carrier liquid evaporates, the microparticles cling tenaciously to the glass surface and reduce gloss therefrom.

However, when attempting to reduce glare with a diffuser means, either by etching or by depositing a coating having particular surface characteristics to reduce glare, there can be a significant loss in resolution of images viewed through the substrate. That is, as the glare reducing ability of the glass substrate or coated glass substrate increases, the resolution of images viewed through the substrate decreases. Thus, there is a need for a diffusing method of reducing gloss which does not significantly reduce the resolution of images viewed through the substrate. In addition, there is a need for reduced gloss, high resolution coatings that may be deposited or formed on substrates.

SUMMARY OF THE INVENTION

The present invention provides a transparent substrate with a diffuser surface coating of less than about 3 microns, and a method of making same. A reduced gloss, high resolution product is achieved which is bendable, overcoatable with functional coatings such as transparent conductor coatings, abrasion resistant, and generally serviceable for its intended use.

DESCRIPTION OF THE PREFERRED EMBODIMENT

Figure 1:
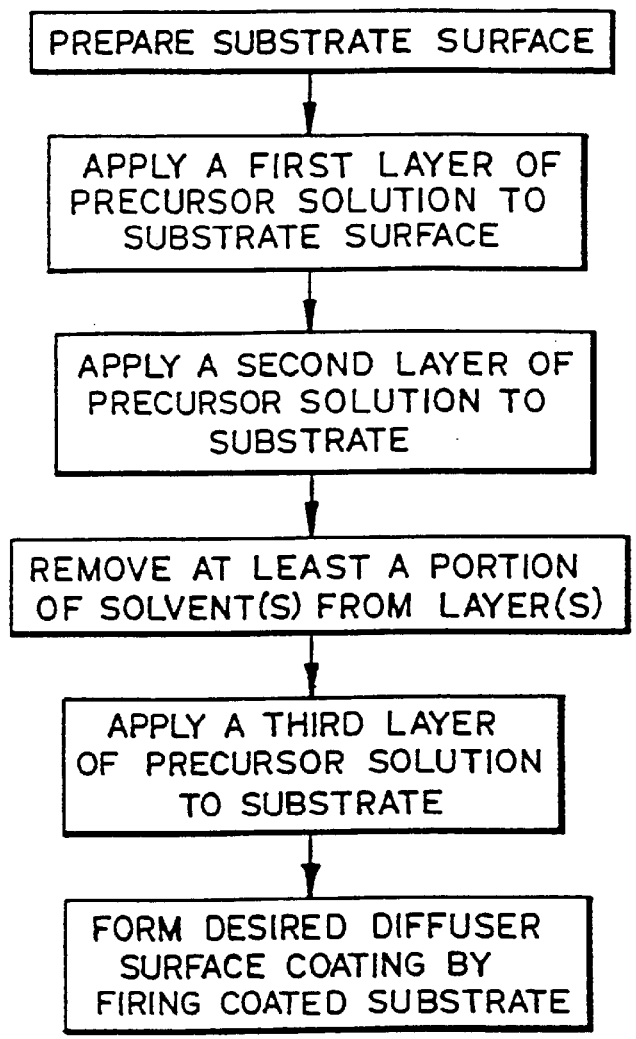
FIG. 1 is a flowchart of the process of the preferred embodiment.

In the preferred embodiment, a transparent substrate is spray coated, preferably in an iterative manner, to a cured thickness of less than about 3 microns, more preferably less than about 1 micron and most preferably less than about 0.8 microns, with a precursor solution formed by dissolving a precursor of an inorganic metal oxide in an organic solvent, which when processed according to the preferred embodiment, forms a solid, diffuser surface coating on the substrate. The diffuser surface coating formed by spray application of the precursor solution comprises an inorganic metal oxide, preferably based upon a transition metal. Although a wide array of substrate materials may be utilized, it is preferred to utilize a clear glass substrate such as clear soda lime glass with a transmittance (T) greater than about 70% typically, and preferably, greater than about 85% T. Suitable substrates also include tinted glass such as gray glass with a transmittance ranging from about 20% T to about 70% T, and preferably from about 30% T to about 65% T, as measured with an integrating sphere and using Standard Illuminant A and a photopic detector. In addition, the substrate itself can be coated with a functional coating such as a transparent conductor coating such as doped tin oxide, indium tin oxide (ITO), doped zinc oxide or the like, with the precursor solution sprayed onto the functional coating so that the functional coating is overcoated with the diffuser surface coating.

The precursor solution used in the preferred embodiment comprises one or more metal oxide precursors such as alkoxides, halides, oxyhalides, acetates, peroxyesters, nitrates, etc.; organic solvents such as one or more alcohols, esters, ethers, anhydrides, etc.; and one or more acids such as organic and inorganic acids. The concentration of precursor, expressed as equivalents of the corresponding oxide, ranges from about 1% to about 20% equivalents of oxide by weight of solution. Preferably, an alkoxide of the formula $M(OR)_4$, is used where M is preferably silicon and R is a $C_1$ to $C_6$ alkyl group. Most preferably, the alkoxide is a silica precursor such as tetraethylorthosilicate in a concentration of about 1% to about 10% (expressed in equivalents of $SiO_2$), which when processed according to the preferred embodiment, forms a silica diffuser surface coating. It may also be preferred to utilize a single metal oxide precursor in the precursor solution. The concentration of organic solvent depends upon the properties desired for the precursor solution. Those skilled in the art of spray coating will appreciate the proportion of solvent to utilize to achieve desired properties such as viscosity, rate of evaporation of volatiles, solubilization of precursor, etc. It is preferred to utilize one or more alcohols for the organic solvent. One or more optional components may also be added to the precursor solution of the preferred embodiment depending upon the characteristics desired for the resulting coating. Representative examples of such optional components include, but are not limited to, surface wetting agents such as surfactants; tinting agents such as dyes, pigments and colorants; and conducting agents such as conductive powders and additives. A most preferred precursor solution comprises about 18.75% tetraethylorthosilicate, about 2.23% acetic anhydride, about 3.63% water, about 0.079% phosphoric acid (85% acid in aqueous solution), about 0.91% 2,4-pentanedione, about 1.24% 1-pentanol, about 19.38% ethyl acetate, about 15% ethanol, about 17.5% methanol and about 21.25% acetone (all component concentrations are expressed as weight percentages of the total weight of the solution). This equates to a concentration of tetraethylorthosilicate precursor, expressed as equivalents of silica, of about 5.4%. It will be noted that in the broader aspects of the invention, a precursor solution of different precursors could be used, e.g. a zirconium oxide precursor and silica precursor blend, which would form a zirconium oxide/silica diffuser surface coating. It is not necessary to do so to obtain a diffuser surface coating. It is not done in the preferred embodiment.

After formulation it is desirable to store the solution, such as by storing at room temperature for about 1 to about 10 days and preferably for about 3 to about 7 days or longer, before use. Storing for such periods allows desired reactions such as partial hydrolysis and partial condensation to occur. Thereafter, the solution has an optimal shelf life of from about 2 days to about 14 days or longer.

Furthermore, an indium tin oxide precursor solution, a tin oxide precursor solution, a doped tin oxide (such as using antimony dopant and/or fluorine dopant) precursor solution, and a doped zinc oxide (such as using an aluminum dopant) precursor solution can be used or combined with other metal oxide precursor solutions to form diffuser surface coatings that are conducting, antistatic, and EMI/RFI shielding, and thus have added utility.

In a preferred embodiment, the precursor solution is spray applied in a "controlled stacking" technique as illustrated in FIG. 1. A first layer of precursor solution, or more preferably first and second layers, are created by making one or more spray passes over the substrate, followed by removal of at least a portion of solvent(s) from the layer(s) of precursor solution. After sufficient removal of solvent, one or more additional layers are applied. This layered "stack" is then fired to form the desired diffuser surface coating.

Figure 2:
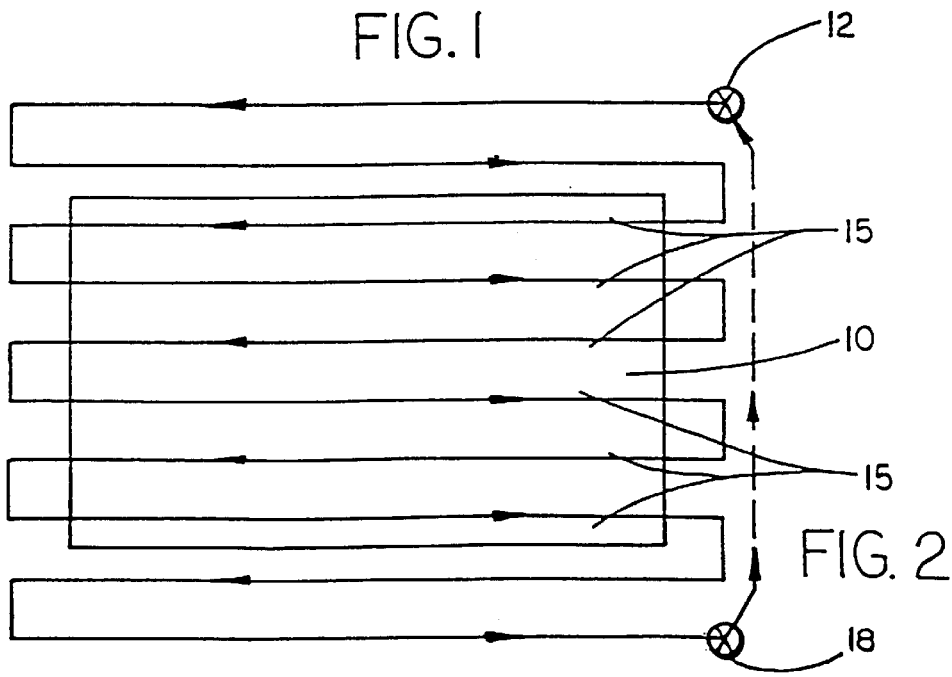
FIG. 2 illustrates a spray technique utilized in the preferred embodiment.

More specifically, the surface of the substrate to be coated is prepared by washing with a detergent, and preferably accompanied by brushing or some other mechanical scrubbing means. After washing, the substrate is rinsed with deionized water and dried. Next, a first layer of a precursor solution as described herein is sprayed or similarly deposited onto the substrate surface. It is preferred to spray the solution onto a substrate 10 in the pattern illustrated in FIG. 2. The pattern is initiated at a point which preferably is not disposed over or in line with substrate 10, such as location 12. Depending upon the width of the spray discharge (item 40 in FIG. 3) at the point of contact with the surface of substrate 10, numerous traversing passes 15 are made over the surface with minimal overlap between adjacent passes, to perform a first "spray pass". After completion of a spray pass and formation of a first layer of precursor solution, the spray pattern may be terminated or suspended at a point which preferably is not disposed over or in line with substrate 10, such as location 18. The overall height and width dimensions of a spray pattern may be varied by adjusting the dimensional parameters of each individual traversing pass 15 and spray discharge 40.

Figure 3:
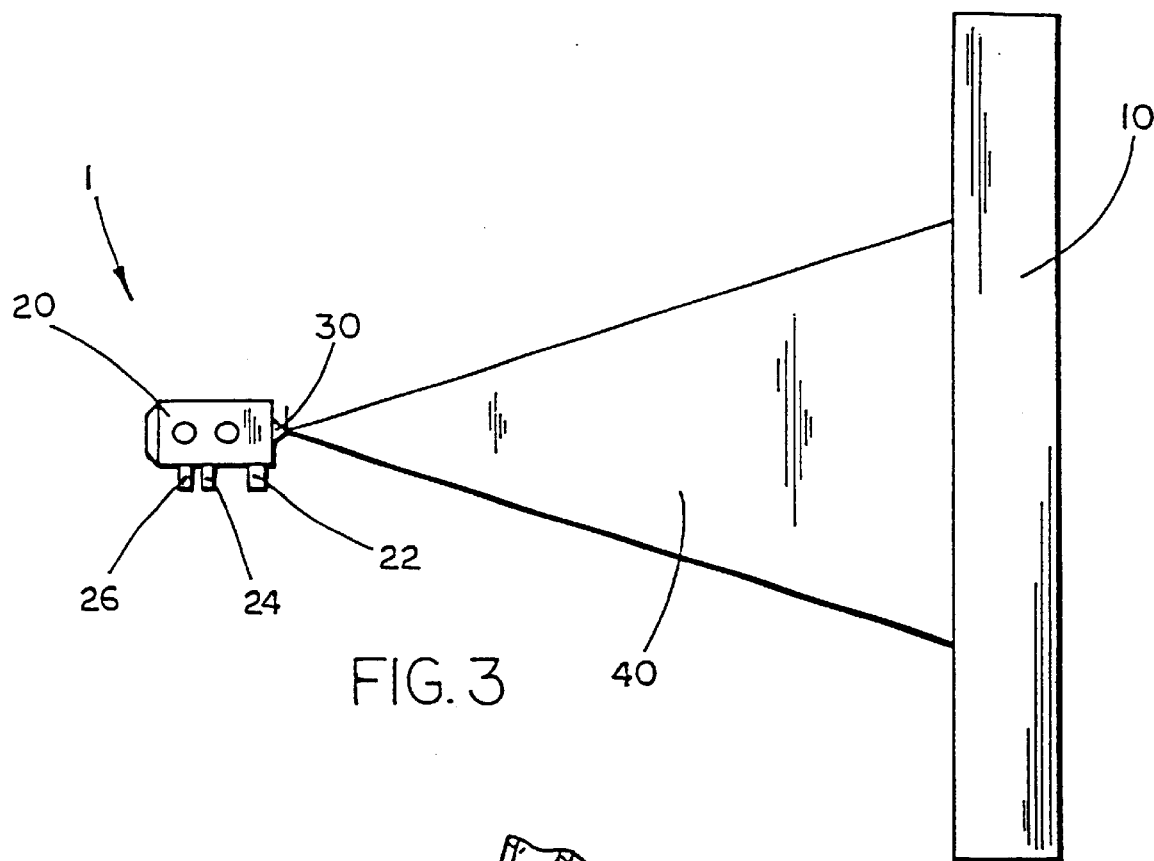
FIG. 3 illustrates a spraying apparatus configuration employed in the preferred embodiment.

FIG. 3 illustrates a preferred configuration for a spraying apparatus 1 applying a spray discharge 40. The spray passes may be performed by an X-Y traversing system employing multiple spray guns for parallel production. A typical spraying configuration comprises a moveable spray gun 20 having a spray head 30 and provisions for a fluid line 22 for transfer of a coating solution to gun 20, a cylinder line 24 for control of fluid delivery, and a cap line 26 for fluid atomization. Spray gun 20 is preferably an air atomizing spray gun. Examples of preferred spray guns include ACG-550 automatic spray gun available from DeVilbiss Ransburg Industrial Coating Equipment of Maumee, Ohio, or VAU Autojet nozzle from Spraying Systems Company of Wheaton, Ill.

The preferred process parameters are as follows. The precursor solution is atomized during spraying by use of a spray head pressure as measured at head 30 of approximately 100 psi. The distance between spray gun head 30 and substrate 10 is preferably about 13 inches to about 14 inches. The width of spray discharge 40 contacting the surface of substrate 10 is about 8 inches to about 12 inches. Preferably, that width is as measured at right angles with the directions of traversing passes 15. The temperature of the spraying solution, environment and substrate during deposition of all the layers described herein is preferably at about ambient temperature, for instance from about 15° C. to about 30° C. Spraying may be conducted in an ordinary air atmosphere, although if desired, spraying can occur in an inert atmosphere such as provided by blanketing with nitrogen gas. The humidity of the spraying environment during spraying of all the layers described herein is preferably from about 25% relative humidity (RH) to about 60% RH, more preferably from about 30% RH to about 50% RH, and most preferably from about 35% RH to about 45% RH. Moreover, it is desirable that the discharge from spray apparatus 1 be relatively continuous and not be interrupted during application of the layers described herein since interruptions tend to adversely affect the uniformity of the resulting coating. The spraying of the first layer and of all other layers described herein is performed utilizing a spray discharge rate of from about 0.01 liters per minute (l/min) to about 1.0 l/min, preferably from about 0.05 l/min to about 0.5 l/min, and most preferably from about 0.08 l/min to about 0.4 l/min.

After depositing a first layer, a second layer is optionally applied immediately or shortly thereafter, in the same manner as for the first layer. After completing this operation to form a preliminary coating, the gloss reading of the substrate is about 30 to about 70 gloss units as measured using a standard 60° angle of incidence meter, such as that manufactured by BYK-Gardner of Silver Spring, Md. More preferably, the gloss reading of the substrate coated with the preliminary coating is about 40 to about 65 gloss units, and most preferably about 50 to about 60 gloss units. The preliminary coating may be partially densified, whereby the gloss reading typically rises about 10 to 20 gloss units. Partial densification is accomplished by further removal of solvent from the preliminary coating. Partial densification may be facilitated in a variety of fashions such as by exposure to elevated temperatures such as in batch type ovens or continuous throughput lehrs, or by exposure to infrared heating sources, such as infrared lamps, for limited periods such as about 1 to about 10 minutes or longer at 100° C. to 550° C. Alternatively, partial densification may be achieved by exposure to ambient temperatures, or to temperatures slightly above ambient temperatures, such as within the range of about 15° C. to about 50° C., for a period of at least about 15 minutes. We find it useful to use infrared heaters whose radiation is directed to the substrate side coated with the preliminary coating. Preferably, the infrared radiation is preferentially absorbed by the preliminary coating on the surface of the substrate with the coated surface achieving a temperature of at least about 100° C. for a time period of at least about 1 minute, preferably at least about 3 minutes or longer.

One or more additional layers may then be applied over the preliminary coating in the same fashion as for the first and any optional second layers. The gloss reading after this additional coating is about 10 to 20 gloss units lower than that of the first or preliminary coating and is typically in the range of about 30 to about 75 gloss units, and most typically is in the range of about 55 to about 65 gloss units.

The thus applied coatings are fired by exposing the coated substrate to a temperature in the range of from about 250° C. to about 600° C., preferably in the range of from about 350° C. to about 550° C., and most preferably in the range of from about 500° C. to about 520° C. to convert to the desired diffuser surface coating. The time period for firing should be sufficient so that condensation and hydrolysis reactions are substantially completed. Generally, when firing at temperatures of from about 250° C. to about 600° C., the time period varies from about 1 to 3 hours to about 3 to 10 minutes. We find it useful to load coated substrates onto a conveyor and pass through a heated lehr, or alternately, batch type ovens can be used.

Also, with appropriate control of spray parameters and conditions, formation and partial densification of a preliminary coating may be dispensed with and the diffuser surface coating of this invention can be achieved by spraying at least one layer of precursor solution followed by firing as described above to achieve both reduced gloss and a high resolution.

The resulting diffuser surface coating of the preferred embodiment achieves both reduced gloss and a high resolution. By "reduced gloss" it is meant that the coating has a gloss reading in the range of about 80 to about 30 gloss units or lower, measured as is known in the gloss measuring art. The preferred embodiment diffuser surface coating preferably has a gloss reading of less than about 70 gloss units, such as from about 40 to about 70 gloss units. The term "high resolution" as used herein refers to a resolution of at least about 3 lines to about 15 lines per mm or higher as measured in accordance with the U.S. Air Force 1951 Military Resolution Test Pattern. According to that method, the test substrate is positioned 1.5 inches from the test pattern and the pattern then read through the substrate. Preferably, the resolution of the preferred embodiment diffuser surface coating is at least about 4 lines per mm and is within the range of about 4 to about 12 lines per mm. Another advantage associated with the preferred embodiment diffuser surface coating is its relative thinness. The diffuser surface coating of the preferred embodiment has a thickness less than about 3 microns, preferably less than about 1 micron, and most preferably less than about 0.8 microns. The thinness of the preferred embodiment diffuser surface coating renders it particularly amenable to application and formation on a flat substrate and with post formation bending of the diffuser surface coating and flat substrate without significant cracking, crazing, or other deleterious effects in physical or optical properties.

Figure 4:
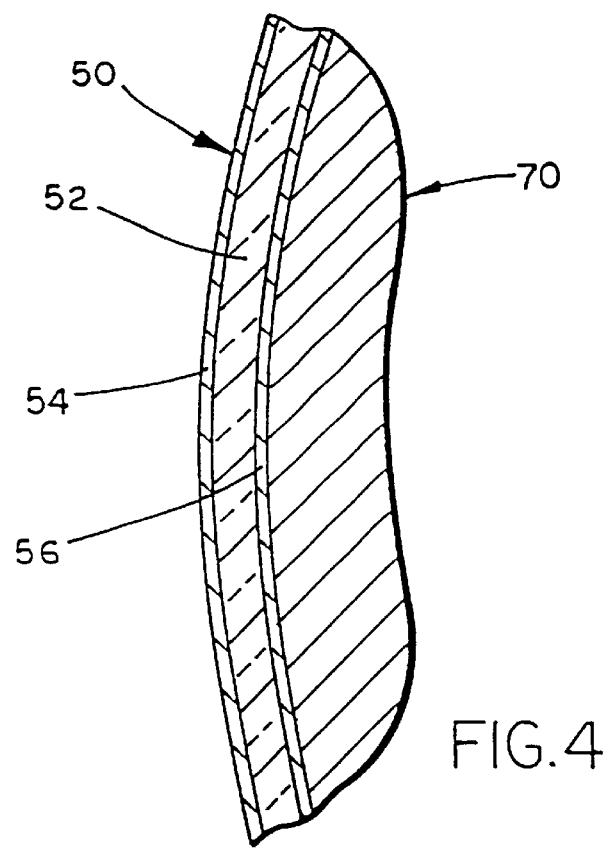
FIG. 4 is a section of a cathode ray tube faceplate incorporating the present invention.

With reference to FIG. 4 the present invention has particular applicability for cathode ray tube (CRT) faceplates such as that shown at 50 and most preferably for faceplates 50 formed separately from fabrication of the CRT and that are contacted over the screen 70 of the CRT, preferably using an index matching medium 56 such as an index matching adhesive, as is known in the faceplate mounting art. As is known, such faceplates 50 typically have a compound curvature and should ideally reduce glare from ambient light while not significantly reducing resolution of images produced by the CRT. In forming such a faceplate 50 having a diffuser surface coating 54 such as of the preferred embodiment, it is preferred to apply the diffuser surface coating prior to bending the glass substrate to the appropriate compound curvature or spherical curvature desired. This practice enables the practitioner to store stock glass sheets already diffuser surface coated and suitable for a wide array of uses instead of a collection of specific substrates having particular curvatures. In addition, it is easier to prepare a flat substrate for application of the diffuser surface coating than a curved substrate. However, the diffuser surface coating may also be applied to a curved substrate.

The following examples illustrate forming a curved, glare-reducing faceplate for a computer monitor. Example 1 illustrates the prior art of bending a sheet of conventional etched glass, followed by depositing a conductive film on the etched surface to form a faceplate. Example 2 describes forming a curved, glare-reducing faceplate by application of the diffuser surface coating of the preferred embodiment followed by bending the glass substrate and depositing a conductive film.

EXAMPLE 1

In this example, a faceplate for use as a touchscreen on a computer monitor was fabricated using conventional etched glass. A flat etched glass lite of appropriate dimensions 18" by 25" by 0.125" thick, was purchased from a conventional supplier of chemically etched glass. This etched glass, upon receipt, had a gloss of about 67 gloss units and a resolution of about 3 lines per mm. A flat substrate in the general shape and dimension corresponding to a 13" diagonal CRT faceplate was cut from this etched glass lite. This flat substrate was then bent to a spherical curvature (with the etched surface on the convex surface) of 22.6" spherical radius by press bending in a conventional glass bender by heating the etched glass in excess of about 550° C. and by press bending on a bending mold to the desired curvature. After bending, a conductive film coating of antimony doped tin oxide was deposited on the etched low-gloss convex surface of the bent faceplate using vacuum deposition by sputtering followed by exposure to elevated temperatures in the range of about 250° C. to about 500° C. to achieve desired optical and electrical properties in the conductive thin film coating.

EXAMPLE 2

In this example, a faceplate 50 for use as a touchscreen on a computer monitor 70 as shown in FIG. 4 was fabricated using the diffuser surface coating 54 of the preferred embodiment described herein. A conventional soda lime glass sheet 52 was obtained from Guardian Glass of sheet size 18" by 23" by 0.125". The substrate surface was prepared for subsequent application of the diffuser surface coating 54 by passing the substrate through a mechanical brush washer that utilized detergent scrub and air knife dry as known in the glass cleaning art. The substrate was loaded onto a spray fixture and a first layer of precursor solution was applied in accordance with the preferred embodiment described herein. The average thickness of this first layer was about 1877 A°. Immediately after depositing the first layer, a second layer was applied; the combined average thickness was measured to be about 2417 A°. The gloss as measured for this preliminary coating was about 58.87 gloss units and the resolution was greater than about 6 lines per mm. Next, the glass substrate and combined layers were further dried and partially densified by heating at a temperature of about 500° C. for 10 minutes. The gloss was measured to be about 75.81 gloss units and the resolution was about 10 lines per mm. The substrate surface was then further cleaned to remove contaminants that might have accumulated as a result of processing. Next, a final, third layer was applied over the preliminary coating by spraying as described herein. As applied, the gloss reading with the third layer was 57.16 gloss units and resolution was about 6 lines per mm. Next, the as-applied third layer and resulting stack were fired at 500° C. for 10 minutes. After firing, the gloss reading was 61.99 gloss units and the resolution was 8 lines per mm. This diffuser coating was measured to have a thickness of about 0.5 microns.

After forming the diffuser surface coated low gloss flat substrate, a 13" diagonal flat substrate having suitable shape and dimensions for use on a CRT as described in Example 1, was cut from this sheet. The cut substrate was successfully bent as described in Example 1 with the diffuser surface coating disposed on the convex surface, without deterioration in optical or physical performance. Also, the diffuser surface coating was conductor coated, as in Example 1, again without deterioration in optical or physical performance. The diffuser surface coating thus formed and overcoated with a conductive thin film, performed comparable in optical and physical characteristics such as abrasion resistance and consumer utility as the faceplate of Example 1. The faceplate 50, which was a touchscreen, was suitable for attachment to the CRT screen 70 of a computer monitor using an effective amount of an index matching adhesive material 56 such as is conventionally used in the faceplate attachment art, disposed on the concave surface of the faceplate (i.e. on the substrate surface that is opposite the surface that is coated with the diffuser surface coating), and so as to function as a touchscreen and to exhibit the reduced gloss and high resolution described herein.

A finished product comprising glass and the diffuser surface coating described herein has all the properties required for post processing operations such as glass fabricating techniques including cutting, seaming, and bending. The finished product is able to withstand subsequent thin film deposition processing steps such as washing, and various thin film deposition techniques such as sputtering. The finished coated product is also able to withstand post deposition operations such as high temperature oxidation and reduction as is required for some applications. Throughout all the above manufacturing or post processing steps, the coated substrate maintains its integrity both optically as well as physically.

The relatively thin coatings of the preferred embodiment effectively deliver a combination of resolution and gloss reduction superior to currently known diffusing means. The coatings of this invention are relatively thin, economical to deposit, amenable to bending without physical or mechanical deterioration, amenable to overcoating with a wide array of functional coatings, and abrasion scratch resistant as deposited, or if bent and/or overcoated after deposition. An example of a functional coating is a transparent conductor coating such as indium tin oxide or doped tin oxide, including fluorine doped tin oxide and antimony doped tin oxide.

Of course, it is understood that the foregoing is merely a preferred embodiment of the invention and that various changes and alterations can be made without departing from the spirit and broader aspects thereof as set forth in the appended claims, which are to be interpreted in accordance with the principles of patent law, including the Doctrine of Equivalents.

The embodiments of the invention in which an exclusive property or privilege is claimed are defined as follows:

1. A method of forming a diffuser coating on a transparent substrate, said method comprising:

spraying at least one layer of a precursor solution onto a transparent substrate to form a preliminary coating;

at least partially densifying said preliminary coating;

spraying a further layer of a precursor solution onto said preliminary coating; and firing said preliminary coating and said further layer to form a diffuser surface coating on said substrate;

said method including at least one of a) forming said coating to have a gloss reading less than about 80 gloss units, b) forming said coating to have a resolution of at least 3 lines per millimeter, c) forming said coating to have a thickness of less than about 3 microns, and d) firing said preliminary coating and said further layer at a temperature in the range of from about 250° C. to about 600° C.

2. The method of claim 1 including forming said diffuser surface coating to have a gloss reading in the range of about 30 to 80 gloss units and a resolution in the range of about 3 lines to about 15 lines per millimeter.

3. A method of forming a diffuser coating on a transparent substrate, said method comprising:

spraying at least one layer of a metal oxide precursor solution onto a transparent substrate to form a preliminary coating;

at least partially densifying said preliminary coating;

spraying a further layer of a metal oxide precursor solution onto said preliminary coating; and firing said preliminary coating and said further layer at a temperature in the range of from about 250° C. to about 600° C. to form a diffuser surface coating on said transparent substrate having a thickness of less than about 3 microns, a gloss reading in the range of about 30 to about 80 gloss units, and a resolution in the range of about 3 lines to about 15 lines per millimeter; and overcoating said diffuser surface coating on said transparent substrate with a transparent conductor coating.

4. The method of claim 3 wherein said transparent conductor coating is selected from the group consisting of indium tin oxide, tin oxide, doped tin oxide, and doped zinc oxide.

5. The method of claim 1 further comprising bending said substrate having said diffuser surface coating thereon.

6. The method of claim 1 including forming said diffuser surface coating to have a resolution in the range of about 4 to about 12 lines per millimeter.

7. The method of claim 1 including forming said diffuser surface coating to have a gloss reading in the range of about 40 to about 70 gloss units.

8. The method of claim 1 wherein said diffuser surface coating has a thickness of less than about 3 microns.

9. The method of claim 1 wherein said precursor solution comprises a single metal oxide precursor.

10. The method of claim 1 wherein said precursor solution comprises a silica precursor.

11. The method of claim 1 wherein said firing is performed by heating said preliminary coating and said further layer to a temperature in the range of from about 250° C. to about 600° C.

12. The method of claim 11 wherein said firing is performed by heating said preliminary coating and said further layer to a temperature in the range of from about 350° C. to about 550° C.

13. The method of claim 12 wherein said firing is performed by heating said preliminary coating and said further layer to a temperature in the range of from about 500° C. to about 520° C.

14. The method of claim 11 wherein said firing is performed by heating said preliminary coating and said further layer for a time period of from about 3 minutes to about 3 hours.

15. The method of claim 1 wherein said partial densification of said preliminary coating is performed by exposure to infrared heating.

16. A method of forming a diffuser coating on a transparent substrate, said method comprising:

providing a precursor solution comprising a precursor of an metal oxide dissolved in an organic solvent;

spraying at least one layer of said precursor solution onto said transparent substrate; and firing said at least one layer at a temperature within the range of from about 250° C. to about 600° C. to form a diffuser surface coating having a thickness less than about 3 microns, a gloss reading of about 30 to about 80 gloss units, and a resolution in the range of about 3 lines to about 15 lines per millimeter.

17. The method of claim 16 wherein said precursor is selected from the group consisting of one or more metal alkoxides, metal halides, metal oxyhalides, metal acetates, metal peroxyesters, metal nitrates, and combinations thereof.

18. The method of claim 16 wherein said spraying of said at least one layer is performed while the temperature of said precursor solution and said substrate is at about ambient temperature.

19. The method of claim 16 wherein said spraying of said at least one layer is performed at a relative humidity of from about 25% RH to about 60% RH.

20. The method of claim 16 wherein said spraying of said at least one layer is performed utilizing an average spray discharge rate of from about 0.01 liters per minute to about 1.0 liters per minute.

21. The method of claim 1 further comprising coating said transparent substrate with a transparent conductor coating prior to forming said preliminary coating and said further layer of precursor solution.

22. The method of claim 21 wherein said transparent conductor coating is selected from the group consisting of indium tin oxide, tin oxide, doped tin oxide, and doped zinc oxide.

23. The method of claim 16 further comprising overcoating said diffuser surface coating on said transparent substrate with a transparent conductor coating.

24. The method of claim 23 wherein said transparent conductor coating is selected from the group consisting of indium tin oxide, tin oxide, doped tin oxide, and doped zinc oxide.

25. The method of claim 16 further comprising coating said transparent substrate with a transparent conductor coating prior to spraying said at least one layer of said precursor solution.

26. The method of claim 25 wherein said transparent conductor coating is selected from the group consisting of indium tin oxide, tin oxide, doped tin oxide, and doped zinc oxide.

\* \* \* \* \*